United States Patent Office 2,885,799
Patented May 12, 1959

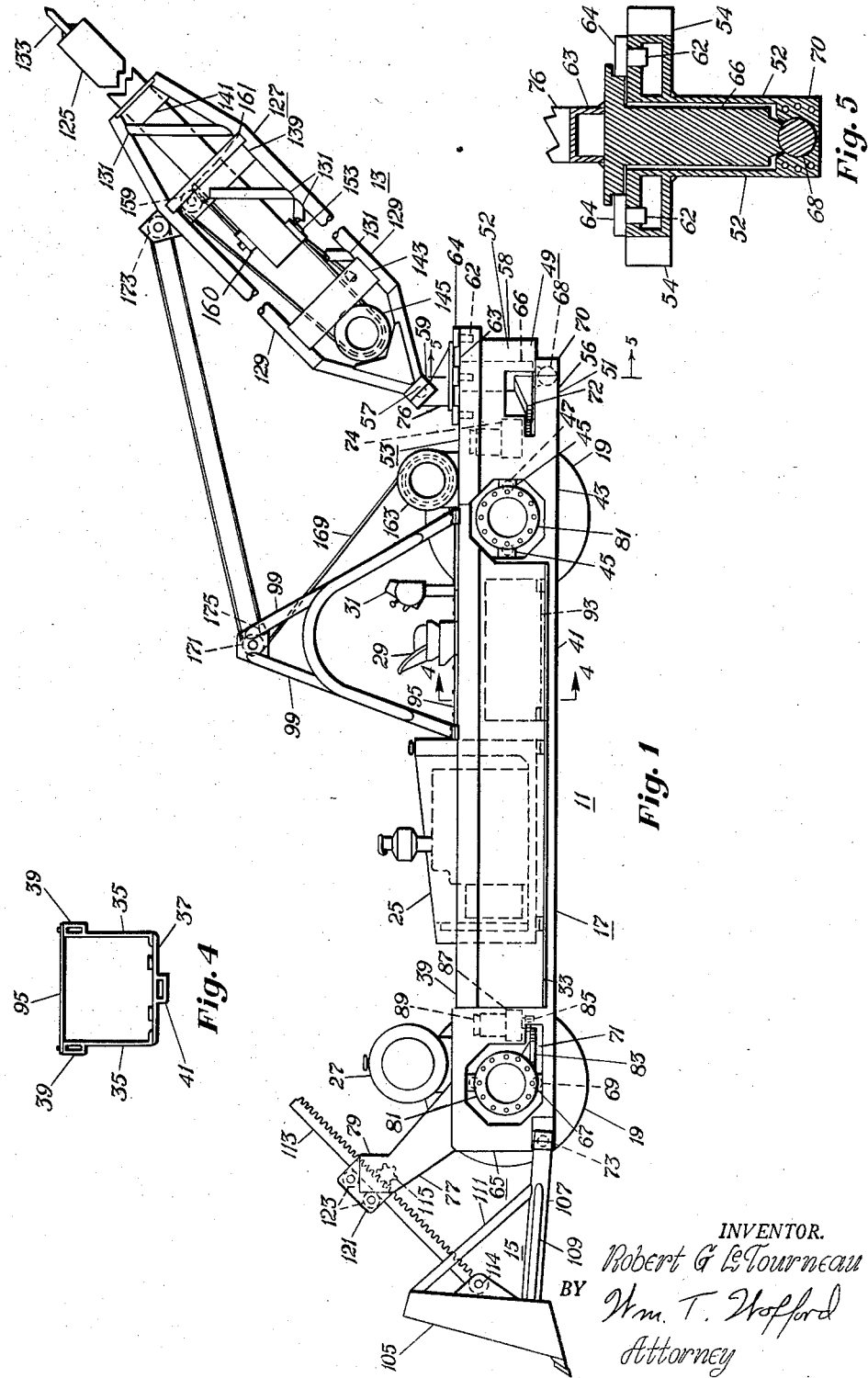

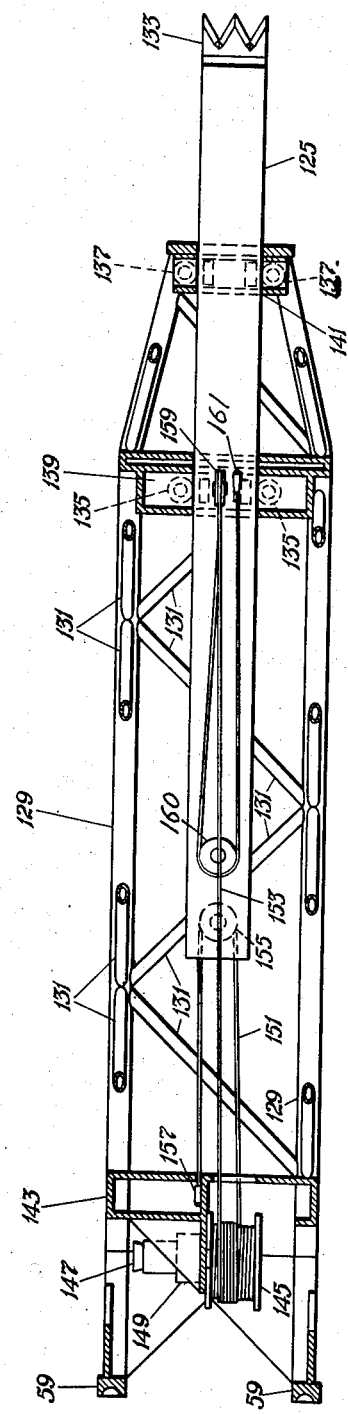

2,885,799
TREE FELLING MACHINE

Robert G. LeTourneau, Longview, Tex.

Application April 4, 1956, Serial No. 576,189

3 Claims. (Cl. 37—2)

My invention relates to land clearing machinery and more particularly to machinery adapted for felling trees by exerting force on the trunks.

In the prior art of which I am aware, the force requisite for felling a large tree has been provided either by tractive effort of a felling vehicle or by manipulation of an extensible boom associated with a felling vehicle. In both cases it has been necessary to make the vehicle excessively heavy, and consequently cumbersome and costly. A tree felling machine providing the necessary force for felling while substantially reducing vehicle weight with consequent reduced cost and increased mobility, would be most welcome in the land clearing industry.

It is accordingly an object of my invention to provide a machine which is capable of felling large trees by exerting force on their trunks without depending upon vehicle tractive effort.

It is another object of my invention to provide a tree felling machine which is capable of uprooting large trees without depending on vehicle wheel traction.

It is another object of my invention to provide a machine which has tree uprooting capability comparable to that of a much heavier prior art machine.

It is another object of my invention to provide a self-propelled tree felling machine that is more economical to build than prior art machines of comparable capability.

These and other objects are effected by my invention, as will be apparent from the following description, taken in accordance with the accompanying drawings, in which:

Figure 1 is a schematic side elevational view of the tree felling machine of my inventon, with the near wheels and wheel drive assemblies removed;

Figure 2 is a plan view of the machine, with the pusher boom removed;

Figure 3 is a plan view of the pusher boom with the top half of the boom carriage removed; and Figure 4 is a detail section view taken on lines 4—4 of Figure 1.

Figure 5 is an enlarged section view taken on lines 5—5 of Figure 1.

The tree felling machine in accordance with a preferred embodiment of my invention comprises a wheeled vehicle 11 carrying an extensible and retractable boom assembly 13 at one end and an extensible and retractable ground engaging brace or anchor assembly 15 at the other end.

The vehicle comprises a body, indicated generally at 17, wheels 19, wheel drive assemblies (not shown), front and rear axles 21, 23, power plant 25, fuel tank 27, and operators seat 29 and control station 31. The body 17 has a box portion 33 made up of heavy steel side plates 35 and end plates and a bottom plate 37 all welded to form a unitary structure. The box 33 is reinforced by channel members 39 welded to it all around the upper outside surfaces, and a channel member 41 welded beneath the box bottom extending longitudinally along its center. At the forward end of the body is an axle mount structure 43 made up of welded steel plate members in the form of a relatively narrow upstanding enclosure having parallel sides and integrally fixed to the forward end of the box portion 33, and having a transversely extending octagonal opening therein. The octagonal opening carries oppositely disposed axle mount sockets 45 which cooperate with balls 47 mounted on the front axle 21 to give it rocking motion about a horizontal axis.

Extending forwardly of the axle mount structure and integral therewith is the boom support structure 49. The boom support structure has a lower portion 51 made up of parallel spaced side plates 52 which are integral with and spaced the same as those of the front axle structure 43, a bottom plate 56 extending forwardly of the axle mount structure, and a front plate 58 extending first upwardly from the forward end of the bottom plate, then forwardly for a short distance and then upwardly. The upper portion 53 of the boom support structure is a platform which rests on top of the lower portion 51 and is integral therewith. The platform rear portion is co-extensive with the front of box 33 and the side walls 54 taper inwardly to the diameter of the platform front wall 60 which is semicircular. The platform carries a plurality of upright roller pins 62 arranged on the circumference of a circle at its upper front portion. Disc-shaped rollers 64 are journalled to the pins. The rollers are arranged to take the side thrust of a turn-table 63 which is supported by a vertical shaft 66 having a ball 68 at its lower end. The ball is carried by a ball socket 70 which is fixed to the lower front portion. A gear quadrant 72 is fixed adjacent the lower end of the turn-table shaft and extends rearwardly therefrom. An electric motor driven gear box 74 is mounted within the boom support lower portion rearwardly of the gear quadrant and has an output pinion in mesh with the gear quadrant to provide for powered limited rotation of the turn-table. Mounted on top of the turn-table is a rigid pedestal 76 which carries a heavy cylindrical cross-beam 78 having a ball 57 fixed to each end thereof. These balls cooperate with sockets 59 on the boom assembly 13 to give it pivoting movement in a vertical plane.

At the rear end of the body box portion 33 is a rear axle mount structure 65 made up of welded steel plate members in the form of a relatively narrow upstanding enclosure having parallel sides and integrally fixed to the rear end of the box portion 33, and having a transversely extending octagonal opening therein, said opening carrying oppositely disposed axle mount sockets 67 which cooperate with balls 69 mounted on the rear axle 23 to give it swinging motion about a vertical axis. The octagonal opening has a forwardly extending recess portion 71 along its entire length at the lower right side for a purpose to be hereinafter described. The lower rear portion of the rear axle mount structure 65 carries a pair of oppositely disposed balls 73 which cooperate with sockets 75 on the ground engaging brace assembly to allow motion of the brace assembly in a vertical plane. A welded steel plate pedestal structure 77 is fixed to the top of the rear axle support structure 65 at is longitudinal center portion and extends rearwardly and upwardly therefrom, terminating in a pair of upstanding spaced parallel side pieces 79 for a purpose to be hereinafter described. The vehicle axles 21, 23 are tubular members carrying bolt flanges 81 at both ends, and each mounting a pair of oppositely disposed balls 47, 69 at their longitudinal centers for cooperating with sockets on the axle support structures as aforementioned. The rear axle 23 has a sector gear 83 integrally fixed to its lower front portion. The sector gear 83 is engaged by the output pinion 85 of a gear box 87 which is mounted above the sector gear within the axle support structure 65 and driven by an electric motor 89. The vehicle wheel and wheel drive assemblies are self-contained and bolt directly onto the respective bolt flanges, with an electric motor 91 which drives the respective wheel through a gear box contained in the wheel, extending into the tubular axle. The vehicle power plant 25, which comprises an internal combustion engine driving an electric generator is mounted in the rear portion of the body box 33. The various necessary contactors and electric control devices are mounted in an enclosure 93 which is carried in the body box ahead of the power plant. The operator's seat 29 and control station 31 are mounted on the body box 33 above the contactor and control device enclosure 93. The area around the seat and control station is floored with metal plates 95 which are bolted to the top side of the body box. The vehicle fuel tank 27 is mounted on suitable brackets fixed to the top of the rear axle support structure 65. A pyramidal frame structure 97 comprising four tubular members 99 is fixed to the body box and centered over the operators seat 29 with a sheave mount at its vertex. A pair of parallel spaced inverted bow-shaped tubular members 101 are fixed to a pair of the pyramidal frame side members, and are spanned by a roof plate 103 to form a cab canopy.

The extensible and retractable ground engaging brace or anchor assembly 15 includes a large upstanding blade member 105 extending over most of the vehicle width. The blade support structure includes a pair of spaced parallel main support members 107 fixed to the blade back equidistant from the blade longitudinal center and adjacent the blade lower edge and extending forwardly therefrom and terminating in sockets 75 which cooperated with the balls aforementioned on the rear axle support structure to provide for pivoting movement of the blade 105 about a horizontal axis. A pair tubular bracing members 109 each have one end fixed adjacent an end of the blade back near the bottom and extend forwardly and inwardly, with the other end fixed to a respective main support member 107. A further pair of spaced parallel tubular bracing members 111 each have one end fixed adjacent the top portion of the blade back, above a respective main support member and extended downwardly and forwardly and are fixed at the other end to a respective main support member. A gear rack 113 is pivoted on the horizontal axis at 114 to the blade back center portion and extends upwardly and forwardly therefrom between the upstanding parallel spaced side members 79 of the pedestal structure aforementioned. The rack teeth are engaged by the output pinion 115 of a gear box 117 which is mounted on one of the said side plates 79, and which is driven by an electric motor 119. A roller housing 121 is fixed between said side plates above the rack 113 and mounts a pair of rollers 123 which engage the back of the rack to hold it in proper contact with the pinion 115.

The boom assembly 13 includes a boom carriage, the boom 125, the power operated boom extending and retracting apparatus, and the boom raising and lowering mechanism. The boom carriage comprises a tower-like framework 127 structure made up of welded tubular members and having rectangular cross-section outline. Four longitudinally extending main members 129 are located at the rectangle corners and are parallel over most of the carriage length, but taper at the ends as will be hereinafter more fully explained. A lattice work of brace members 131 are welded between each set of adjacent main members 129. The boom 125 is a long box beam made of heavy welded steel plates and having rectangular cross-section. A toothed tree engaging blade 133 is fixed to the boom 125 at its outer end. The boom 125 is slideably supported and guided by a pair of roller sets 135, 137 which are mounted in housings 139, 141 that are spaced longitudinally of the boom. Rollers of each set engage the boom on all four sides. The roller housings, which are a part of the boom carriage, are rectangular box structures made up of heavy welded steel plate members, and having transversely extending openings therein to accommodate the boom 125. The roller housings 139, 141 are carried inside the carriage frame 127, being fixed at their corner portions to respective carriage frame main members 129. The carriage frame tapers slightly inwardly from the first roller housing 139 to the second one 141 which is located at the frame extreme forward end. A rectangular box-like spacing member 143 made of welded steel plate is located near the carriage rear end, and is fixed at its corner portions to the respective main members 129. At the rear end of the carriage frame the main members taper inwardly from just rearward of the spacing member and terminate in sockets 59 which cooperate with balls 57 on the boom support structure 49 as aforementioned. The boom extending and retracting apparatus is cable-operated and comprises a cable drum 145 driven by an electric motor 147 through a gear box 149, the assembly being mounted within the carriage frame 127 just rearward of the spacing member 143. The drum 145 carries two cables 151, 153, wound so that one pays off and the other pays on when the drum 145 is rotated. The boom retracting cable 151 extends off the drum, through the spacer member 143, over a sheave 155 at the boom end portion, and back to the spacer member, where it is dead-ended at 157. The boom extending cable 153 comes off the drum 145, through the spacer member 143, over a sheave 159 located on the rear roller housing 139, and back over a sheave 160 adjacent the boom rear end and then forward to housing 139, where it is dead-ended at 161. The boom raising and lowering system is cable operated, and comprises a cable drum 163 driven by an electric motor 165 through a gear box 167, the assembly being mounted on the top rear portion of the platform of the boom support structure upper portion 53. The cable 169 extends off the drum upwardly and rearwardly over a sheave 171 at the vertex of the pyramidal frame, then forwardly and over a sheave 173 fixed to the center portion of the top side of the rear roller housing 139, then back to the vertex of the pyramidal frame 97, where it is dead-ended at 175. The sheave mount arrangement for the boom raising and lowering system shown is suitable for only limited boom horizontal swing. If more extensive horizontal boom swing is required, then the sheave mount system may be modified in accordance with well known principles. Alternatively, the boom raising and lowering system may be mounted on the boom turn-table if desired.

To fell a tree, the vehicle 11 is maneuvered to a position near the tree and in line with the desired felling direction. The ground engaging brace 15 is then lowered into firm engagement with the ground, and the boom 125 raised to the desired angle and extended into contact with the tree. The boom assembly may be swung slightly to right or left to provide for minor adjustments in alignment. As the boom pushes on the tree the brace is forced into the ground until it has picked up sufficient load to counteract the force required to fell the tree, and then the further extension of the boom pushes the tree over. The horizontal component of the force exerted by the boom upon the tree is transferred through the vehicle frame to the brace. The vehicle weight and tractive capability play no significant part in the felling operation. It is thus apparent that the combination of the extensible boom and the ground engaging brace make it possible to fell a tree with a machine that needs much less weight and power, and is therefore more economical to build and operate than machines that would otherwise be required.

While I have shown my invention in only one form, it will be apparent to those skilled in the art that it is not so limited, but is susceptible of various changes and modifications without departing from the spirit thereof.

I claim:

1. A self-propelled mobile tree felling machine comprising a rigid body supported by front and rear wheel groups at least one of which is steerable and at least one of which is power driven, a power driven extensible and retractable boom pivotally mounted on the front end of said body for swinging movement in a vertical plane and extending longitudinally of said body for pushing against a tree to be felled, power operated means for controlling movement of said boom in a vertical plane, a ground engaging brace mounted at the rear end of said body, said brace comprising an upstanding blade extending transversely of said body, a blade support structure extending forwardly therefrom, means pivoting said support structure at one end to said body so that said blade may swing in a vertical plane from raised position to a ground-engaging position beyond the end of said body, power driven means for raising and lowering said blade, said power driven means including rigid brace means for holding said support structure against pivoting movement except when said blade is being raised or lowered.

2. A self-propelled mobile tree felling machine comprising a rigid body supported by front and rear wheel groups at least one of which is steerable and at least one of which is power driven, a power driven extensible and retractable boom pivotally mounted at the front end of said body for swinging movement in a vertical plane and extending longitudinally of said body for pushing against a tree to be felled, power operated means for controlling movement of said boom in a vertical plane, a ground-engaging brace mounted at the rear end of said body, said brace comprising an upstanding blade extending transversely of said body, a blade support structure extending forwardly therefrom, means for pivoting said support structure at one end to said body so that said blade may swing in a vertical plane from raised position to a ground-engaging position beyond the end of said body, a support structure mounted on said body above said blade support structure, a prime mover mounted on said support structure and having an output pinion, and a rack pivotally mounted at one end to said blade support structure and engaging said output pinion.

3. A self-propelled mobile tree feeling machine comprising a rigid body supported by front and rear wheel groups at least one of which is steerable and at least one of which is power driven, power driven horizontal pivot means mounted on the front end portion of said body, a power driven extensible and retractable boom pivotally mounted on said pivot means for swinging movement in a vertical plane and extending longitudinally of said body for pushing against a tree to be felled, power operated means for controlling movement of said boom in a vertical plane, a ground-engaging brace mounted at the rear end portion of body, said brace comprising a blade extending transversely of said body, a blade support structure extending forwardly therefrom, said support structure being pivotally mounted at its free end to the rear end portion of said body so that said blade may swing in a vertical plane from raised position to a ground-engaging position beyond the end of said body, a pedestal structure fixed to the rear end portion of said body and extending rearwardly and upwardly therefrom, an electric motor driven gear reduction fixed on said pedestal and including a rack guide structure and an output pinion, and a rack pivotally fixed at one end to said blade support structure, with the rack engaging said output pinion.

References Cited in the file of this patent
UNITED STATES PATENTS

| | | |
|---|---|---|
| Re. 23,895 | Winget | Nov. 9, 1954 |
| 268,947 | Schuh | Dec. 12, 1882 |
| 403,811 | White | May 21, 1889 |
| 922,450 | Bennett | May 25, 1909 |
| 1,027,286 | Semran et al. | May 21, 1912 |
| 1,049,697 | Gee | Jan. 7, 1913 |
| 1,319,058 | Fitzpatrick | Oct. 21, 1919 |
| 1,455,575 | Eaton et al. | May 15, 1923 |
| 1,554,131 | Scharf | Sept. 15, 1925 |
| 1,719,313 | Scott | July 2, 1929 |
| 2,191,048 | Tims | Feb. 20, 1940 |
| 2,436,510 | Ferguson | Feb. 24, 1948 |
| 2,462,314 | Fugua | Feb. 22, 1949 |
| 2,535,099 | Slick | Dec. 26, 1950 |
| 2,542,952 | White | Feb. 20, 1951 |
| 2,618,871 | Craver | Nov. 25, 1952 |
| 2,781,927 | Holopainen | Feb. 19, 1957 |